(12) United States Patent
Lee et al.

(10) Patent No.: US 12,199,348 B2
(45) Date of Patent: Jan. 14, 2025

(54) COMMUNICATION SYSTEM WITH ROTATABLE TRACKER

(71) Applicant: INTELLIAN TECHNOLOGIES INC., Pyeongtaek-si (KR)

(72) Inventors: Hyun Uk Lee, Goyang-si (KR); Min Son Son, Hwaseong-si (KR)

(73) Assignee: INTELLIAN TECHNOLOGIES INC., Pyeongtaek-si (KR)

( * ) Notice: Subject to any disclaimer, the term of this patent is extended or adjusted under 35 U.S.C. 154(b) by 321 days.

(21) Appl. No.: 17/637,135

(22) PCT Filed: May 4, 2020

(86) PCT No.: PCT/KR2020/005825
§ 371 (c)(1),
(2) Date: Feb. 22, 2022

(87) PCT Pub. No.: WO2021/054560
PCT Pub. Date: Mar. 25, 2021

(65) Prior Publication Data
US 2022/0285835 A1    Sep. 8, 2022

(30) Foreign Application Priority Data

Sep. 18, 2019 (KR) ......................... 10-2019-0114980

(51) Int. Cl.
*H01Q 3/02* (2006.01)
*G01S 19/01* (2010.01)
(Continued)

(52) U.S. Cl.
CPC .............. *H01Q 3/02* (2013.01); *G01S 19/01* (2013.01); *H01Q 1/125* (2013.01); *H01Q 1/34* (2013.01);
(Continued)

(58) Field of Classification Search
CPC ...... H01Q 1/125–1257; H01Q 3/02–10; G01S 3/42; G01S 3/325; G01S 19/01
See application file for complete search history.

(56) References Cited

U.S. PATENT DOCUMENTS

| 4,994,815 | A | * | 2/1991 | Nakayama | ................ | G01S 3/42 |
| | | | | | | 343/765 |
| 5,043,737 | A | * | 8/1991 | Dell-Imagine | ............ | G01S 3/42 |
| | | | | | | 342/359 |

(Continued)

FOREIGN PATENT DOCUMENTS

| KR | 20070107663 A | 11/2007 |
| KR | 20090081628 A | 7/2009 |

(Continued)

OTHER PUBLICATIONS

International Search Report and Written Opinion for application No. PCT/KR2020/005825 dated Aug. 10, 2020.

*Primary Examiner* — Ab Salam Alkassim, Jr.
(74) *Attorney, Agent, or Firm* — MOSER TABOADA

(57) ABSTRACT

A communication system according to one embodiment comprises: a communication device including a tracking unit which rotates with respect to a first axis, a second axis, and a third axis that are orthogonal to each other and which performs radio-wave communication with a moving object moving within the field of view; and a controller for controlling the communication device so that the tracking unit rotates with respect to the first axis and the second axis in the range of a first trajectory angle of the moving body and rotates with respect to the second axis and the third axis in the range of a second trajectory angle of the moving object.

5 Claims, 6 Drawing Sheets

(51) Int. Cl.
*H01Q 1/12* (2006.01)
*H01Q 1/34* (2006.01)
*H01Q 1/42* (2006.01)
*H01Q 3/08* (2006.01)
*H01Q 3/10* (2006.01)

(52) U.S. Cl.
CPC ............... *H01Q 1/42* (2013.01); *H01Q 3/08* (2013.01); *H01Q 3/10* (2013.01)

(56) References Cited

U.S. PATENT DOCUMENTS

| | | | | |
|---|---|---|---|---|
| 5,166,689 | A * | 11/1992 | Pankow | H01Q 1/18 342/63 |
| 6,226,760 | B1 * | 5/2001 | Burkhardt | G07C 3/08 703/22 |
| 6,285,338 | B1 * | 9/2001 | Bai | H01Q 19/13 343/882 |
| 6,433,736 | B1 * | 8/2002 | Timothy | H01Q 3/08 342/359 |
| 7,095,376 | B1 * | 8/2006 | Timothy | H01Q 1/125 343/705 |
| 7,239,276 | B1 * | 7/2007 | Bonanni | H01Q 1/288 342/372 |
| 7,333,064 | B1 * | 2/2008 | Timothy | H01Q 1/125 343/705 |
| 7,446,721 | B2 * | 11/2008 | Eom | G01S 3/56 343/781 CA |
| 9,093,742 | B2 * | 7/2015 | Choiniere | H01Q 19/19 |
| 11,424,533 | B2 * | 8/2022 | Cha | H01Q 3/02 |
| 11,522,266 | B2 * | 12/2022 | Zimmerman | H01Q 1/1257 |
| 2006/0077097 | A1 * | 4/2006 | Dybdal | G01S 3/42 342/359 |
| 2007/0052605 | A1 * | 3/2007 | Young | H01Q 1/1207 343/757 |
| 2007/0241244 | A1 * | 10/2007 | Tavassoli Hozouri | F16M 11/18 248/183.1 |
| 2008/0018534 | A1 * | 1/2008 | Wu | H01Q 1/28 342/359 |
| 2009/0231224 | A1 * | 9/2009 | Felstead | H01Q 3/08 343/882 |
| 2010/0117903 | A1 * | 5/2010 | Zheng | H04B 7/086 342/373 |
| 2010/0246886 | A1 * | 9/2010 | Nakamura | G06T 7/246 382/103 |
| 2010/0265149 | A1 * | 10/2010 | Omori | H01Q 3/08 343/766 |
| 2011/0068989 | A1 * | 3/2011 | Bousquet | H01Q 3/02 343/761 |
| 2011/0304737 | A1 * | 12/2011 | Evans | G01S 17/66 250/203.1 |
| 2012/0001816 | A1 * | 1/2012 | Blaney | H01Q 1/125 343/765 |
| 2014/0299734 | A1 * | 10/2014 | Nielsen | H01Q 1/12 248/560 |
| 2015/0059500 | A1 * | 3/2015 | Conrad | H01Q 1/125 74/89.14 |
| 2016/0126626 | A1 * | 5/2016 | Sakai | H01Q 1/125 318/569 |
| 2016/0336652 | A1 * | 11/2016 | Yoshida | H01Q 3/08 |
| 2017/0010341 | A1 * | 1/2017 | Uego | H01Q 3/08 |
| 2017/0031013 | A1 * | 2/2017 | Halbert | G01S 7/414 |
| 2017/0310001 | A1 * | 10/2017 | Jeon | H01Q 3/02 |
| 2018/0048062 | A1 * | 2/2018 | Jo | H01Q 1/1257 |
| 2018/0375188 | A1 * | 12/2018 | Patel | H01Q 1/1264 |
| 2019/0212742 | A1 * | 7/2019 | Qian | G05D 1/10 |
| 2020/0168989 | A1 * | 5/2020 | Fukui | H01Q 1/27 |
| 2021/0057798 | A1 * | 2/2021 | Zimmerman | H01Q 3/08 |
| 2021/0066778 | A1 * | 3/2021 | Cha | H01Q 3/02 |
| 2021/0399416 | A1 * | 12/2021 | Lee | H01Q 1/18 |

FOREIGN PATENT DOCUMENTS

| | | |
|---|---|---|
| KR | 20110112343 A | 10/2011 |
| KR | 101793834 B1 | 11/2017 |
| WO | WO-2013137126 A1 | 9/2013 |

\* cited by examiner

COMMUNICATION SYSTEM WITH ROTATABLE TRACKER

TECHNICAL FIELD

The following description relates to a communication system.

BACKGROUND ART

A communication system for transmitting and receiving radio waves through an antenna is developed. For example, a pedestal for tracking an antenna is disclosed in U.S. Patent Application Publication No. 2014/0299734. While a satellite is tracked on a field of view, an antenna may relatively rapidly rotate in a specific area on the field of view compared to other areas. This phenomenon is also known as a "keyhole effect". In order to control a rotational velocity of the antenna in the specific area, the communication system requires a relatively huge capacity of power source.

DISCLOSURE OF THE INVENTION

Technical Goals

An aspect provides a communication system for avoiding a specific area on a field of view having a keyhole effect.

Technical Solutions

According to an aspect, there is provided a communication system including a communication device including a tracker for rotating with respect to a first axis, a second axis, and a third axis that are orthogonal to each other and performing radio-wave communication with a moving object moving within a field of view, and a controller for controlling the communication device based on a trajectory angle of the moving object, wherein the controller controls the communication device so that the tracker rotates with respect to the first axis and the second axis in a range of a first trajectory angle of the moving object and rotates with respect to the second axis and the third axis in a range of a second trajectory angle of the moving object.

The controller may prevent the tracker from rotating with respect to the third axis in the range of the first trajectory angle.

The controller may determine a rotation angle of the tracker with respect to the third axis to maintain a status in which the tracker tilts by the trajectory angle of the moving object in the range of the second trajectory angle.

The controller may prevent the tracker from rotating with respect to the first axis in the range of the second trajectory angle.

The first axis may be an azimuth axis, the second axis may be an elevational axis, and the third axis may be a cross-level axis.

The cross-level axis may be an axis for a roll motion on a fixed object, hereinafter referred to as a fixed world, having the communication device installed.

The fixed world may be a ship.

The controller may limit an angular velocity of an azimuth angle for the tracker to below a threshold angular velocity.

Advantageous Effects

According to an example embodiment, a communication system may avoid a specific area on a field of view having a keyhole effect.

Additional aspects of example embodiments are not limited to what is described in the foregoing, and other aspects that are not described above may also be learned by those skilled in the art from the following description.

BEST MODE FOR CARRYING OUT THE INVENTION

Figure 1:
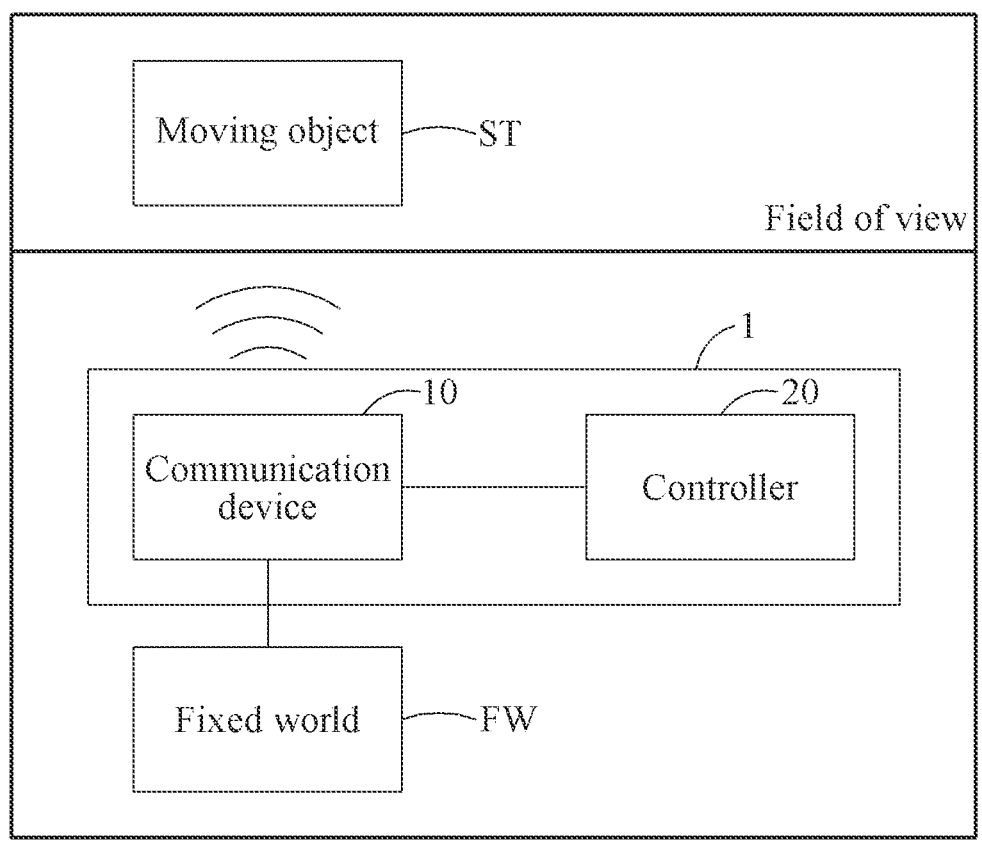
FIG. 1 is a block diagram illustrating a communication system according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The constituent element, which has the same common function as the constituent element included in any one embodiment, will be described by using the same name in other example embodiments. Unless disclosed to the contrary, the configuration disclosed in any one example embodiment may be applied to other example embodiments, and the specific description of the repeated configuration will be omitted.

Figure 2:
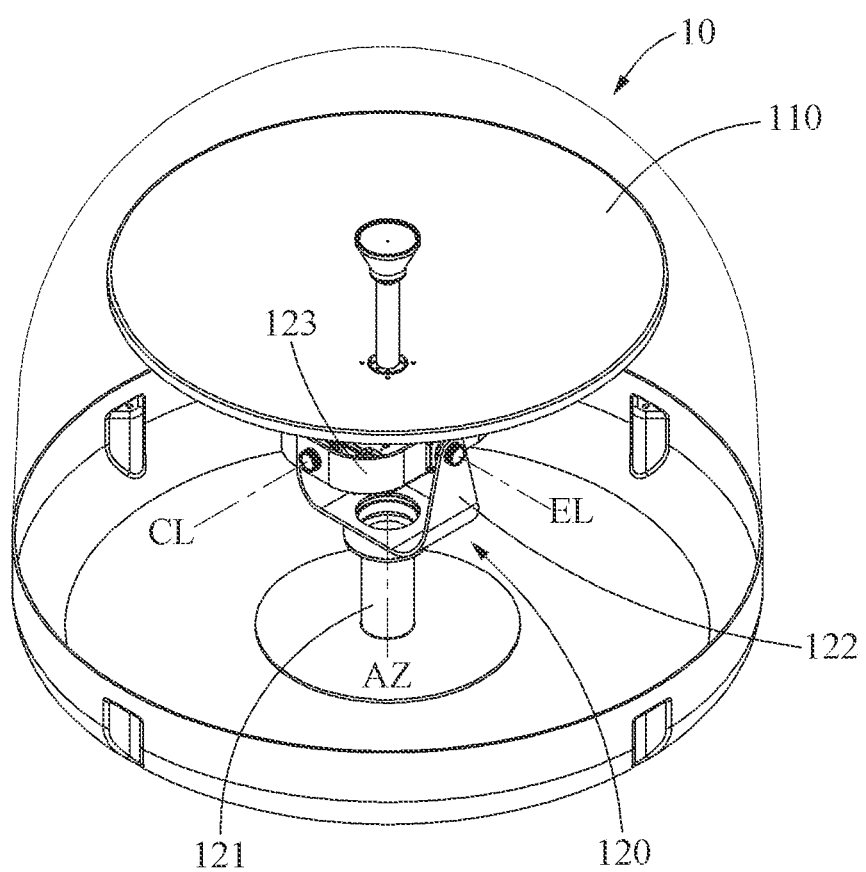
FIG. 2 is a perspective view of a communication device according to an example embodiment.

FIG. 1 is a block diagram for a communication system according to an example embodiment, and FIG. 2 is a perspective view for the communication device according to an example embodiment.

Referring to FIGS. 1 and 2, a communication system 1 may be configured to perform radio-wave communication with a moving object ST on a field of view. The communication system 1 may include a communication device 10 and a controller 20.

The communication device 10 may be configured to transmit and receive radio waves to and from the moving object ST on the field of view. The communication device 10 may include a tracker 110 and a pedestal 120.

The tracker 110 may be configured to track the moving object ST on the field of view. The tracker 110 may include a reflector having a reflective surface, the reflector with an approximately parabolic cross-section. The tracker 110 may be configured to rotate with respect to an elevational axis EL, an azimuth axis AZ, and/or a cross-level axis CL. The elevational axis EL, the azimuth axis AZ, and the cross-level axis CL may be orthogonal to each other.

The pedestal 120 may be configured to support the tracker 110. The pedestal 120 may include a shaft 121, a first gimbal 122, and a second gimbal 123.

The shaft 121 may be configured to rotate with respect to the azimuth axis AZ. The shaft 121 may have an elongated cylindrical shape. The shaft 121 may be installed on a reference plane of a fixed world FW.

The first gimbal 122 may be configured to rotate with respect to the azimuth axis AZ. The first gimbal 122 may be connected to the shaft 121. The first gimbal 122 may be supported by the shaft 121. For example, the first 122 may include a pair of first arms extending from sides of the shaft 121 at an upper end of the shaft 121 and then extending along the azimuth axis AZ.

The second gimbal 123 may be configured to support the tracker 110 and rotate with respect to the elevational axis EL. The second gimbal 123 may be connected to the first gimbal 122. The second gimbal 123 may be supported by the first gimbal 122. For example, the second gimbal 123 may include a body portion connected to the tracker 110 and configured to rotate with respect to the cross-level axis CL and a pair of second arms surrounding the body portion and rotatably connected to the pair of first arms of the first gimbal 122.

The communication device 10 may be installed on the fixed world FW. For example, the fixed world FW may include a surface of the earth, a ship and the like. As a preferred example, the communication device 10 is installed in a ship. Since a ship performs 6-degree of freedom motions on water surface, the communication device 10 installed on the ship needs to track the moving object ST on the field of view while further considering motions to or with respect to multi-axial directions. Although not shown, the controller 20 may also be installed on the fixed world FW together with the communication device 10.

The controller 20 may be configured to control tilting and rotating of the communication device 10 with respect to the elevational axis EL, the azimuth axis AZ, and/or the cross-level axis CL. The controller 20 may control the tilting and rotating of the communication device 10 according to a position of the moving object ST on the field of view. For example, the controller 20 may control the tilting and rotating of the communication device 10 considering a trajectory angle of the moving object ST on the field of view. A specific control scheme of the controller 20 for the communication device 10 will be described in detail with reference to FIGS. 3 through 7.

Figure 3:
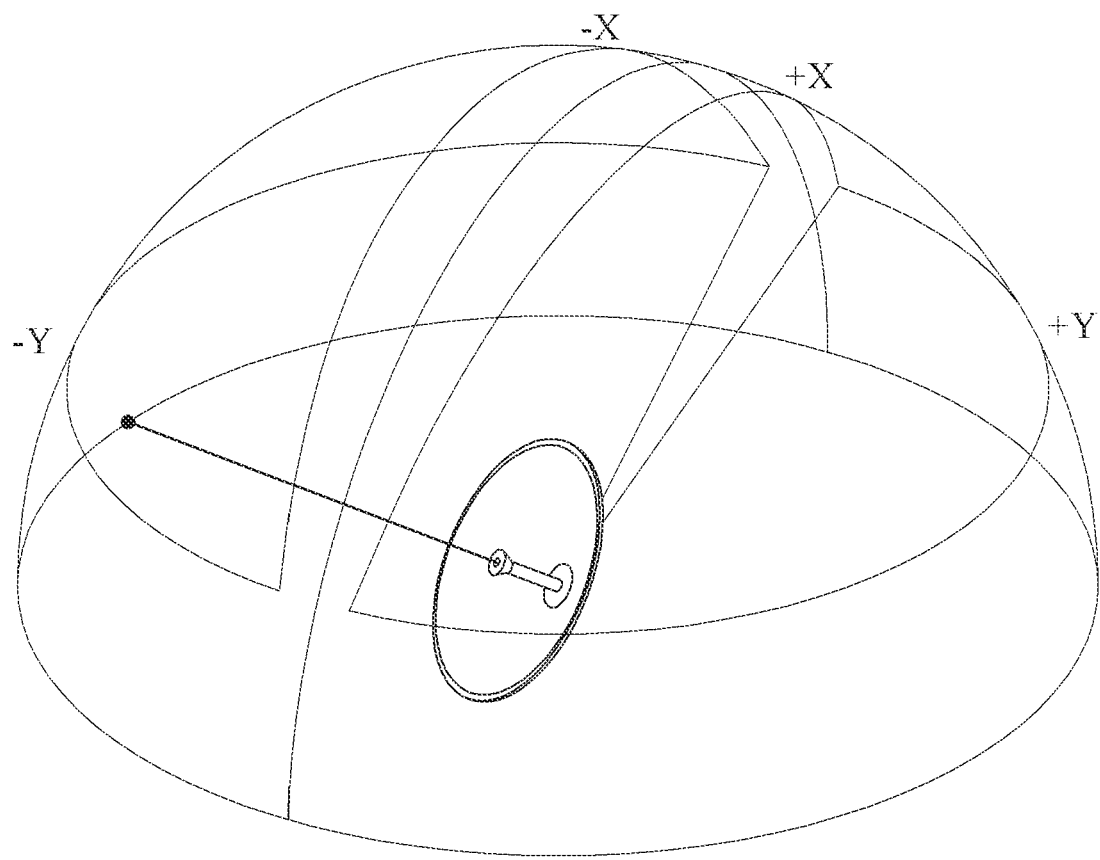
FIGS. 3 and 4 are diagrams illustrating an operation of a communication device in a range of a first trajectory angle according to an example embodiment.
Figure 4:
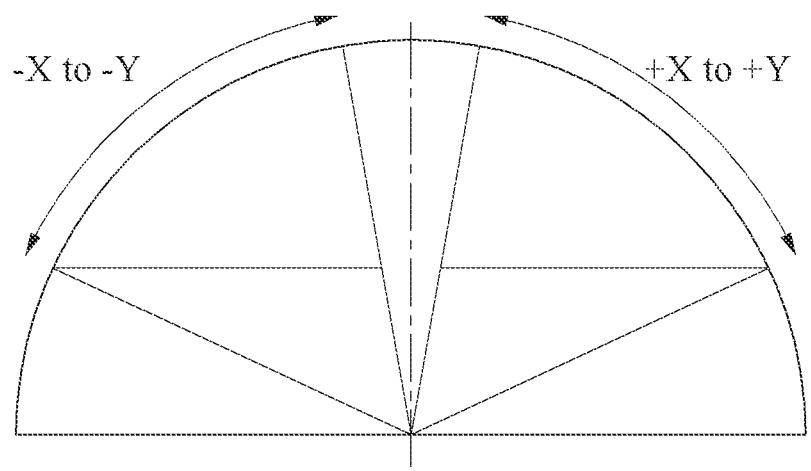

FIGS. 3 and 4 are diagrams illustrating an operation of a communication device in a range of a first trajectory angle according to an example embodiment.

Referring to FIGS. 3 and 4 together, the controller 20 may control an operation of the communication device 10 for the tracker 110 to rotate with respect to the azimuth axis AZ and the elevational axis EL, respectively, to track the moving object ST, while the moving object ST is in a range of a first trajectory angle ($\pm X°$ to)$\pm Y°$ on a field of view. For example, the controller 20 may control rotation of the shaft 121, the first gimbal 122, and/or the second gimbal 123 for the first gimbal 122 to rotate with respect to the azimuth axis AZ for the second gimbal 123 to rotate with respect to the elevational axis EL.

In a non-limiting example, when the communication device 10 (See FIG. 2) is installed on the ground, the range of the first trajectory angle may be $\pm 10°$ to $\pm 54°$. In a non-limiting example, when the communication device 10 is installed on a ship, the range may be $\pm 35°$ to $\pm 79°$.

Meanwhile, there may be a case that rotation of the tracker 110 with respect to the cross-level axis CL in the range of the first trajectory angle is not necessary. In this case, the controller 20 may prevent the tracker 110 from rotating with respect to the cross-level axis CL. For example, the controller 20 may prevent the body portion of the second gimbal 123 from rotating with respect to the cross-level axis CL.

Figure 5:
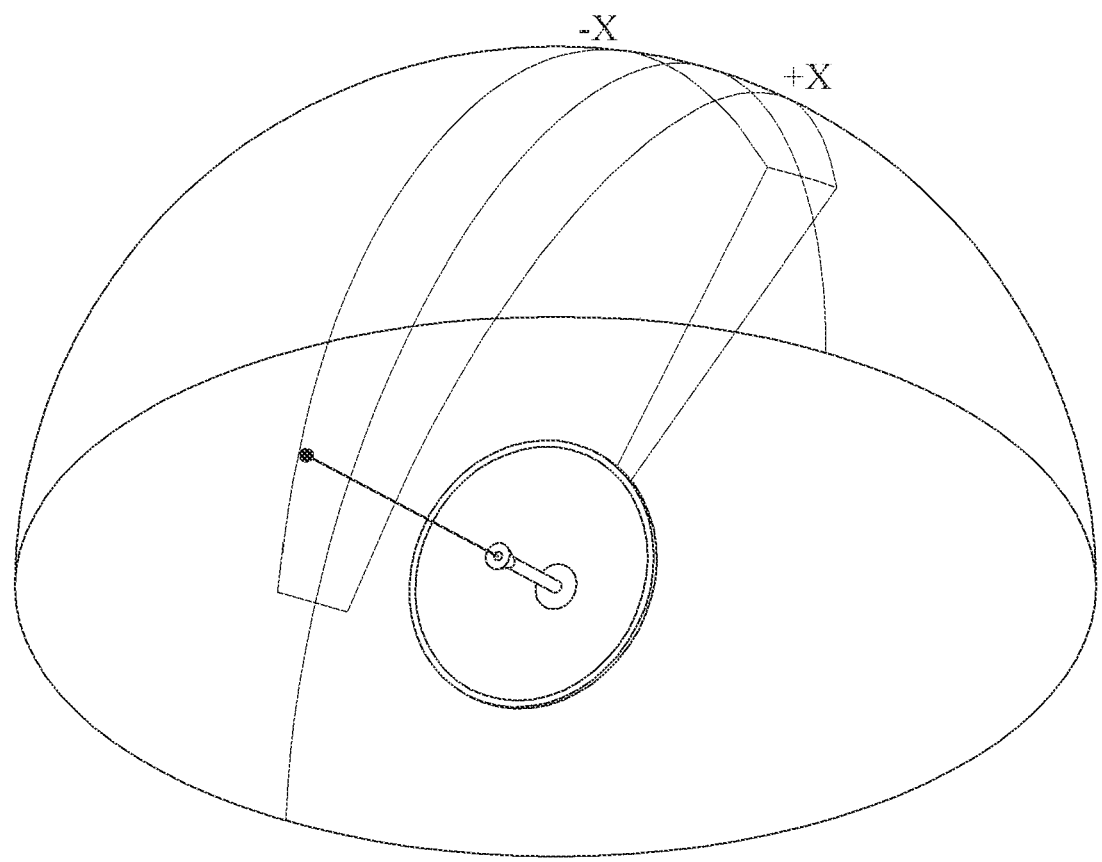
FIGS. 5 and 6 are diagrams illustrating an operation of a communication device in a range of a second trajectory angle according to an example embodiment.
Figure 6:
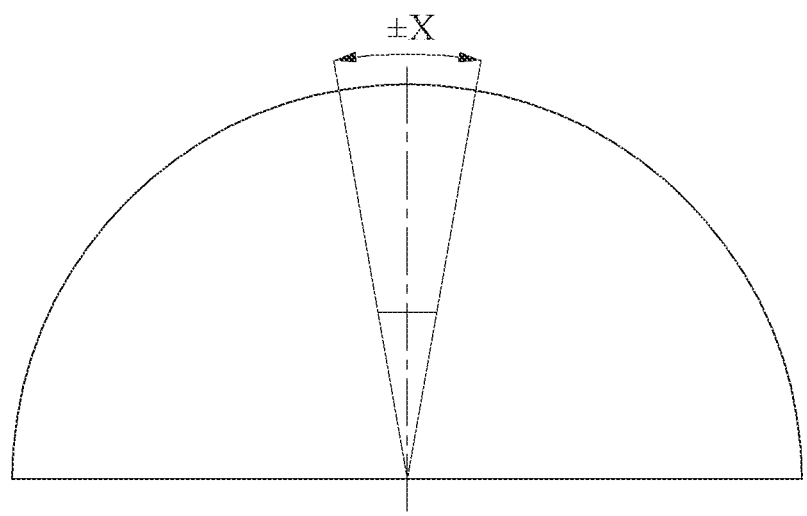

FIGS. 5 and 6 are diagrams illustrating an operation of a communication device in a range of a second trajectory angle according to an example embodiment.

Referring to FIGS. 5 and 6 together, the controller 20 may control an operation of the communication device 10 to make the tracker 110 rotate with respect to the elevational axis EL and the cross-level axis CL, respectively, to track the moving object ST, while the moving object ST is in a range of a second trajectory angle ($-X°$ to $+X°$) on a field of view. For example, the controller 20 may control rotation of the second gimbal 123 to make the second gimbal 123 rotate with respect to the elevational axis EL and make the body portion of the second gimbal 123 rotate with respect to the cross-level axis CL.

In a non-limiting example, when the communication device 10 (See FIG. 2) is installed on the ground, the range of the second trajectory angle may be $-10°$ to $+10°$. In a non-limiting example, when the communication device 10 is installed on a ship, the range may be $-35°$ to $+35°$.

The controller 20 may tilt the tracker 110 with respect to the cross-level axis CL such that a rotation angle of the tracker 110 for the cross-level axis CL and a trajectory angle of the moving object ST may be substantially equal in the range of the second trajectory angle. The controller 20 may control the communication device 10 to maintain a tilting angle of the tracker 110 and the trajectory angle of the moving object ST to be substantially equal in the range of the second trajectory angle.

Meanwhile, there may be a case that the rotation of the tracker 110 with respect to the azimuth axis AZ in the range of the second trajectory angle is not necessary. In this case, the controller 20 may prevent the tracker 110 from rotating with respect to the azimuth axis AZ. For example, the controller 20 may prevent the first gimbal 122 from rotating with respect to the azimuth axis AZ.

Figure 7:
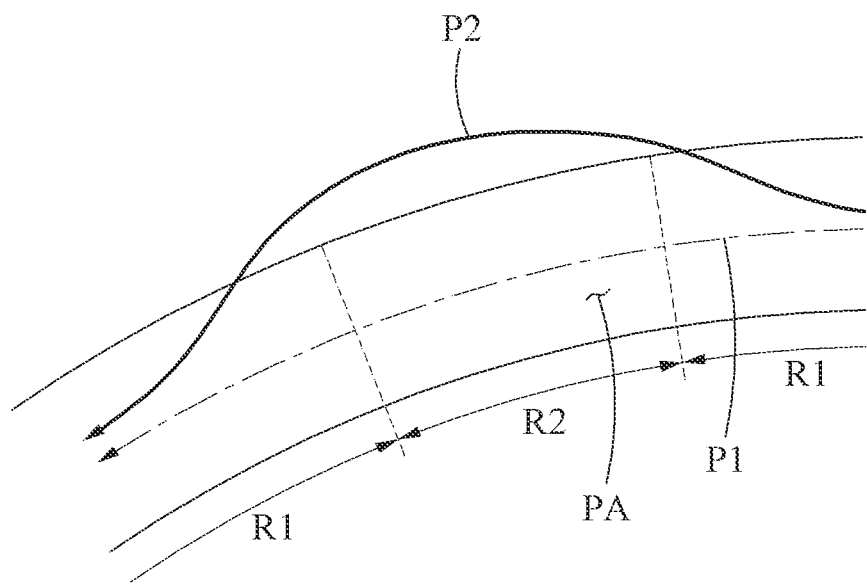
FIG. 7 is a conceptual diagram to describe a control scheme for a communication device according to an example embodiment.

FIG. 7 is a conceptual diagram to describe a control scheme for a communication device according to an example embodiment.

Referring to FIG. 7 together, a conceptual diagram is illustrated to help intuitively understand a specific control scheme of the controller 20 for the tracker 110 with respect to the elevational axis EL, the azimuth axis AZ, and/or the cross-level axis CL.

According to a conventional control scheme, the tracker 110 does not rotate and tilt with respect to the cross-level axis CL but follows a first movement path P1 in which the tracker 110 rotates with respect to the elevational axis EL throughout a range of a first trajectory angle R1 and a range of a second trajectory angle R2. The tracker 110 on the first movement path P1 is bound to pass through a singular area PA on a field of view where a keyhole effect occurs. Since the tracker 110 requires a rapid rotation with respect to the azimuth axis AZ to smoothly track the moving object ST while the tracker 110 is passing through the singular area PA, a relatively large driving torque may be required for the rotation of the tracker 110.

According to the control scheme of the controller 20 of the example embodiment, the tracker 110 follows a second movement path P2 for avoiding the singular area PA throughout the range of the first trajectory angle R1 and the range of the second trajectory range R2. For example, in the range of the first trajectory R1, the tracker 110 may avoid the singular area PA by rotating with respect to the elevational axis EL as in the first movement path P1 and then tilting by a trajectory angle of the moving object ST with respect to the cross-level axis CL and/or maintaining the status of tilting before entering the range of the second trajectory angle R2 having the singular area PA. When the tracker 110 enters the range of the first trajectory angle R1 and starts being away from the singular area PA, the controller 20 may adjust a rotation angle of the tracker 110 for the cross-level axis CL to move along a path similar to the first movement path P1.

Figure 8:
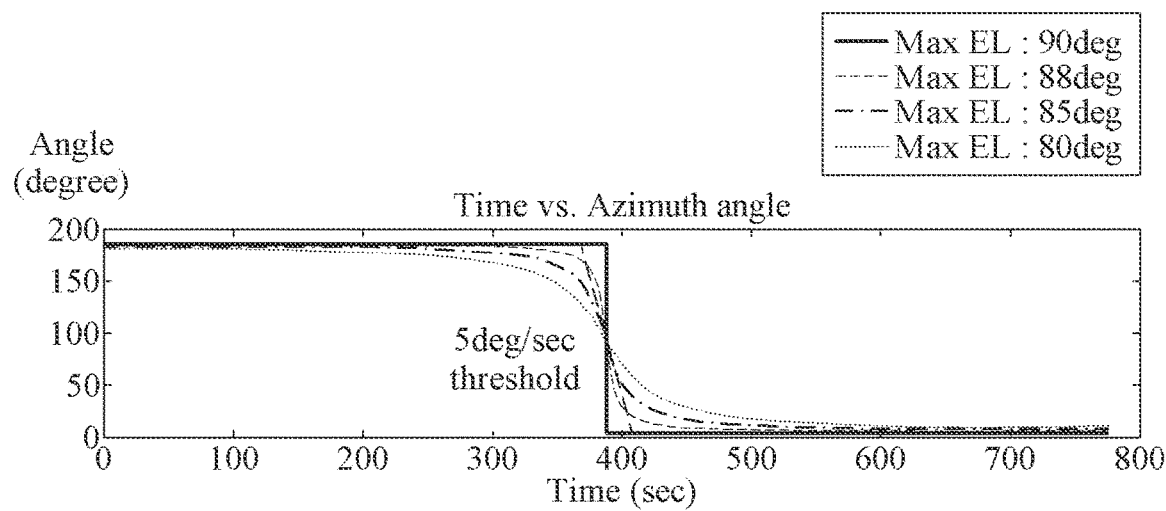
FIGS. 8 and 9 are graphs to describe another control scheme for a communication device according to an example embodiment.
Figure 9:
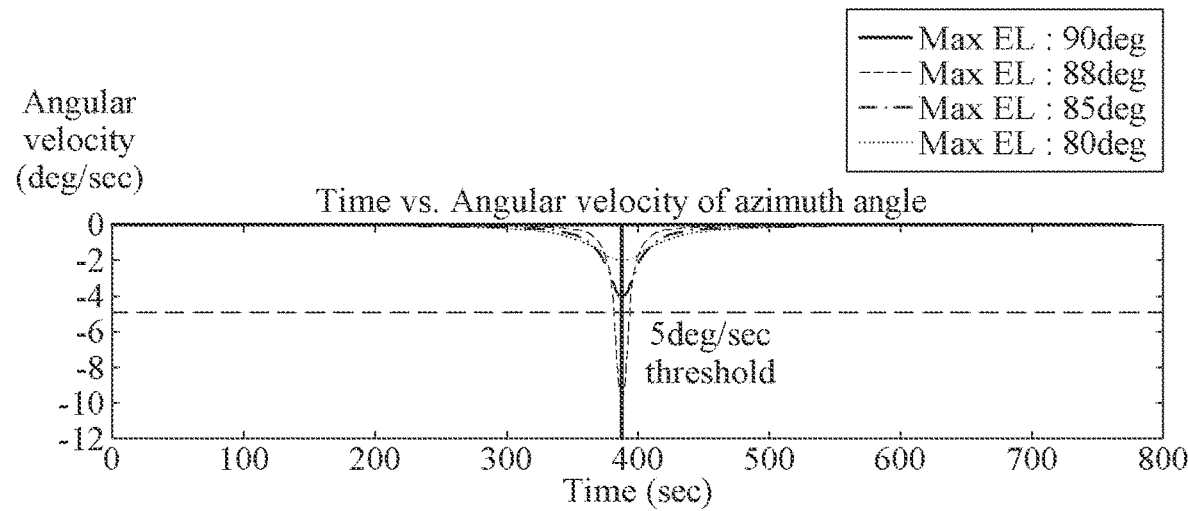

FIGS. 8 and 9 are graphs to describe another control scheme for a communication device according to an example embodiment.

Referring to FIGS. 8 and 9, according to an example embodiment of a communication device, the communication device may be controlled in an alternative way different from the way described above. For example, a controller may limit an angular velocity of an azimuth angle of a tracker to below a threshold angular velocity, and in case that an angular velocity equal to or higher than the threshold angular velocity is required, the controller may control the tracker with a driving based on a three-axis (an azimuth axis, an elevational axis, and a cross-level axis) trajectory to reduce occurrence of load required for driving the tracker. Alternatively, the controller may control the tracker by using a two-axis (the azimuth axis and the elevational axis) trajectory in an environment in which the tracker is driven at the threshold angular velocity or below.

FIG. 8 is a graph showing changes in azimuth angles over time when maximum values of an elevation angle of the tracker are 90°, 88°, 85°, and 80°, and FIG. 9 is a graph showing the angular velocities of the azimuth angles of the tracker when maximum values of the elevation angle of the tracker are 90°, 88°, 85°, and 80°. In the example of FIG. 8, the threshold angular velocity may be 5 degrees per second (deg/sec). In this case, when the maximum values of the azimuth angle are 90° and 88°, a period in which the angular velocity exceeds the threshold angular velocity may be recognized.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A communication system comprising:
a communication device comprising a tracker configured to rotate with respect to a first axis, a second axis, and a third axis that are orthogonal to each other and perform radio-wave communication with a moving object moving within a field of view; and a controller configured to control the communication device based on a trajectory angle of the moving object, wherein the controller controls the communication device so that the tracker rotates with respect to the first axis and the second axis in a range of a first trajectory angle of the moving object and rotates with respect to the second axis and the third axis in a range of a second trajectory angle of the moving object, wherein the controller prevents the tracker from rotating with respect to the first axis in the range of the second trajectory angle, and wherein the controller prevents the tracker from rotating with respect to the third axis in the range of the first trajectory angle, and wherein the first axis is an azimuth axis, the second axis is an elevational axis, and the third axis is a cross-level axis.

2. The communication system of claim 1, wherein the controller determines a rotation angle for the tracker with respect to the third axis to maintain a status in which the tracker tilts by the trajectory angle of the moving object in the range of the second trajectory angle.

3. The communication system of claim 1, wherein the cross-level axis is an axis for a roll motion on a fixed object having the communication device installed.

4. The communication system of claim 3, wherein the fixed object is a ship.

5. The communication system of claim 1, wherein the controller limits an angular velocity of an azimuth angle for the tracker to below a threshold angular velocity.

* * * * *